US008931729B2

(12) United States Patent
Abde Qader Alzu'bi et al.

(10) Patent No.: US 8,931,729 B2
(45) Date of Patent: Jan. 13, 2015

(54) SIDED PERFORMANCE COAXIAL VERTICAL TAKEOFF AND LANDING (VTOL) UAV AND PITCH STABILITY TECHNIQUE USING OBLIQUE ACTIVE TILTING (OAT)

(75) Inventors: Hamzeh Mahmoud Abde Qader Alzu'bi, Ain Albasha-Amman (JO); Imad Abd Allateef, WadiAlseer-Amman (JO); Yahya Zweiri, Tia' Al Ali-Amman (JO); Basim Alkhateeb, Hatem-Irbid (JO); Yahya Taha Ayed Al-Majali, Khalda-Amman (JO)

(73) Assignee: King Abdullah II Design and Development Bureau, Aman (JO)

( * ) Notice: Subject to any disclaimer, the term of this patent is extended or adjusted under 35 U.S.C. 154(b) by 423 days.

(21) Appl. No.: 13/285,206

(22) Filed: Oct. 31, 2011

(65) Prior Publication Data

US 2013/0105620 A1 May 2, 2013

(51) Int. Cl.
*B64C 11/00* (2006.01)
*B64C 27/54* (2006.01)
*B64C 27/20* (2006.01)

(52) U.S. Cl.
CPC ........... *B64C 27/20* (2013.01); *B64C 2201/027* (2013.01); *B64C 2201/042* (2013.01); *B64C 2203/00* (2013.01)
USPC ................... 244/17.13; 244/17.23; 244/17.25

(58) Field of Classification Search
CPC ................ B64C 27/10; B64C 29/0033; B64C 2027/004; B64C 2027/7266; B64C 2201/108; B64C 27/52; B64C 27/12; B64C 27/08
USPC ........... 244/17.3, 17.23, 7 C, 17.25, 8, 6, 181
See application file for complete search history.

(56) References Cited

U.S. PATENT DOCUMENTS

| | | | |
|---|---|---|---|
| 2,950,074 A * | 8/1960 | Stefan ......................... | 244/17.23 |
| 3,181,810 A | 5/1965 | Olson et al. | |
| 3,273,827 A | 9/1966 | Girard | |
| 4,589,611 A * | 5/1986 | Ramme et al. .................... | 244/6 |

(Continued)

OTHER PUBLICATIONS

HobbyKing.com, RC Groups.com; Art-Tech K22 array dual rotor—RC Groups, http://www.rcgroups.com/forums/shothread.php?t=945145?page=3; Feb. 9, 2011, 4 pgs.

(Continued)

*Primary Examiner* — Rob Swiatek
*Assistant Examiner* — George Andonyan
(74) *Attorney, Agent, or Firm* — Fay Sharpe LLP

(57) ABSTRACT

A system for increasing the thrust and power capabilities of a side-by-side vertical takeoff and landing vehicle to optimize the coaxial rotor performance. The system includes a first coaxial rotor spaced from an aircraft body and a second coaxial rotor spaced from the aircraft body and opposite the first coaxial rotor. The first coaxial rotor has a first top propeller aligned with a first bottom propeller along a first rotational axis. The second coaxial rotor having a second top propeller aligned with a second bottom propeller along a second rotational axis. A gyroscopic moment to maintain pitch stability is controlled by modulating the first and second top propellers, which have a different angular speed or different torque from the first and second bottom propellers, and tilting the first and second coaxial rotors towards the central axis with a common tilt angle and a common tilt rate.

19 Claims, 2 Drawing Sheets

(56) References Cited

U.S. PATENT DOCUMENTS

| | | | |
|---|---|---|---|
| 4,913,376 A * | 4/1990 | Black | 244/8 |
| 5,381,985 A * | 1/1995 | Wechsler et al. | 244/7 C |
| 6,086,016 A * | 7/2000 | Meek | 244/17.11 |
| 6,719,244 B1 | 4/2004 | Gress | |
| 6,892,980 B2 | 5/2005 | Kawai | |
| 7,083,142 B2 | 8/2006 | Scott | |
| 2006/0016930 A1 | 1/2006 | Pak | |
| 2006/0226281 A1 | 10/2006 | Walton | |
| 2009/0283629 A1 * | 11/2009 | Kroetsch et al. | 244/17.23 |
| 2010/0108801 A1 * | 5/2010 | Olm et al. | 244/17.23 |

OTHER PUBLICATIONS

Gress Aeronautics; How our aircraft work; http://gressaero.com/kowourmowo.html; Feb. 9, 2011, 2 pgs.

* cited by examiner

SIDED PERFORMANCE COAXIAL VERTICAL TAKEOFF AND LANDING (VTOL) UAV AND PITCH STABILITY TECHNIQUE USING OBLIQUE ACTIVE TILTING (OAT)

BACKGROUND

The present exemplary embodiment relates to a system and method to improve pitch stability for a vertical takeoff and landing aircraft. It finds particular application in conjunction with aircraft including side by side coaxial rotors, and will be described with particular reference thereto. However, it is to be appreciated that the present exemplary embodiment is also amenable to other like applications.

Coaxial vertical takeoff and landing (VTOL) aircraft include rotors having a top propeller and a bottom propeller spaced from each other along a common axis of rotation. Conventional coaxial rotor aircraft systems are required to operate with a balance of torque. Torque balance is achieved by rotating the top propeller in an opposite direction from the bottom propeller with a common angular rate such that the combined rotation results in a torque profile equilibrium. The rotor systems of existing assemblies typically include an axially spaced distance between the top propeller and the bottom propeller of approximately 10% of the propeller diameter. The top propeller and bottom propeller are of equal length. This distance provides adequate space for flapping and bending of propeller blades and to assure adequate clearance between each rotor while the aircraft maneuvers. Fixed pitch propeller blades have been used but require optimization of the axially spaced distance between the propellers and its geometry.

Propellers in a side by side rotor system are dependent on geometric constraints of design. More particularly, the length of each propeller is a function of the space between each rotor and the size of the aircraft body. Rotating propellers must avoid contact with the aircraft body and with each other. Restricting blade size requires propellers to operate at increased rotational speeds to improve performance. However, high rotational speeds are not conducive to cyclic control to both maneuver the aircraft and improve pitch stability.

Attempts to control pitch stability in side by side VTOL aircraft include utilizing control surfaces in the propeller slipstreams and to provide longitudinal tilting of each rotor in relation to the aircraft. However, these solutions result in minimal effectiveness in part, due to the center of gravity and length of each arm from the propeller to the aircraft. Additionally, the longitudinal tilting of the rotors produces an adverse effect due to the generation of additional moment forces on the aircraft body.

Oblique active tilting (OAT) was introduced to remedy pitch stability control for VTOL aircraft with single propeller side by side rotors. OAT generates gyroscopic control moments that improve pitch stability independent from the propeller distance to the center of gravity. This results in an ability to reduce aircraft size while maintaining the same payload limits without losing control effectiveness. However, side by side VTOL aircraft with single propeller rotors have a limited lifting capability.

Therefore, there remains a need to provide a system and method to improve the lifting capacity of a compact VTOL aircraft with side by side rotors.

BRIEF DESCRIPTION

The present disclosure relates to a system for increasing the thrust and power capabilities of a side by side vertical takeoff and landing vehicle and decrease loses in power and thrust of coaxial rotors. The system including a first coaxial rotor spaced from an aircraft body and a second coaxial rotor spaced from the aircraft body and opposite the first coaxial rotor along a common axis. The first coaxial rotor having a first top propeller aligned with a first bottom propeller along a first rotational axis. The second coaxial rotor having a second top propeller aligned with a second bottom propeller along a second rotational axis. A gyroscopic moment is controlled to maintain pitch stability by modulating the first and second top propellers having a different angular speed or different torque from the first and second bottom propellers and tilting the first and second coaxial rotors towards the central axis with a common tilt angle and a common tilt rate while the aircraft is in use.

In one embodiment, the first top propeller and the second top propeller rotate with a common rotational speed and torque and the first bottom propeller and the second bottom propeller rotate with a common rotational speed and torque. Additionally, the first and second top propellers can be spaced from the first and second bottom propellers respectively by less than 3% of the length of the top propellers. Additionally, the diameters of the top propellers are longer than the diameters of the bottom propellers.

The system of the present application controls the gyroscopic moment by optimization of a first torque profile of the first coaxial rotor and a second torque profile of the second coaxial rotor such that the combination of the first torque profile and second torque profile provide a stable pitch balance of the vehicle while in use. The pitch stability is maintained while the first and second top propellers can be operated with a different angular speed or with a different torque profile from the first and second bottom propellers. Additionally, the top propellers can be optionally rotated with a different angular direction or the same angular direction from the bottom propeller.

The side by side coaxial VTOL system can utilize variations of the optimum specifications of a coaxial rotor such as the distance between propellers, the diameter of each propeller, and the pitch of each propeller without having to consider an imbalance in torque between the top and bottom propeller. Notably, pitch response is a function of the difference in torque and angular speed between the top and bottom propellers of each coaxial rotor. The gyroscopic moment is controlled by modulating the differences in torque and angular speed between the top and bottom propeller in each rotor. Gyroscopic moment is reduced by applying the same torque and angular speed for each propeller in the aircraft. Notably, gyroscopic moments are increased by operating the first top and second top propellers with a different torque profile or rotational speed than the first bottom and second bottom propellers.

Each rotor can be rotated or tilted from a generally vertical position to forward position related to a forward direction of the aircraft. It is preferable to simultaneously tilt each rotor along the longitudinal axis to control maneuverability. Longitudinal tilting of each rotor enhances forward movement while OAT enhances pitch stability of the aircraft in maneuverability and during hover.

In another embodiment, a side by side vertical takeoff and landing device includes a first coaxial rotor attached to a first articulating member extending from a first arm and having a first top propeller and a first bottom propeller with fixed pitch blades that are configured to rotate along a first rotational axis, the first arm is rotably connected to a vehicle body along a longitudinal axis. A second coaxial rotor is attached to a second articulating member extending from a second arm and having a second top propeller and a second bottom propeller with fixed pitch blades that are configured to rotate along a second rotational axis, the second arm is rotably connected to the vehicle body along the longitudinal axis.

The first and second articulating members include a servo actuator for laterally rotating the first and second coaxial rotor in proportion toward the vehicle body. Additionally, the first and second arms are rotably connected to the vehicle body by servo actuators for longitudinally rotating the first and second arms in proportion toward a front portion of the vehicle body. The first and second coaxial rotors are controlled to rotate the first and second top propellers with common rotational speed and torque and the first and second bottom propellers with common rotational speed and torque but can be different. The gyroscopic moment is controlled by modulating the differences in torque and angular speed between the top and bottom propellers in each coaxial rotor.

In yet another embodiment, a method of stabilizing a side by side vertical takeoff and landing vehicle is provided. The VTOL aircraft includes a first coaxial rotor spaced from a vehicle body and a second coaxial rotor spaced from the vehicle body and opposite the first coaxial rotor along a common axis. A first top propeller is rotated at the same angular speed and torque as a second top propeller. A first bottom propeller is rotated at the same angular speed and torque as a second bottom propeller. The gyroscopic moment is controlled by tilting the first and second coaxial rotor towards the vehicle body with a common tilt angle and a common tilt rate and by modulating the differences in torque and angular speed between the top and bottom propellers during use to improve a pitch stability of the vehicle.

In one embodiment, the system improves the controllability of the gyroscopic moment generated by tilting coaxial rotors towards the central axis of a side by side VTOL aircraft and modulating the difference between torque and angular speed of the top and bottom propellers. The system enhances the ability to improve the thrust and power performance of the coaxial rotors.

DETAILED DESCRIPTION

It is to be understood that the detailed figures are for purposes of illustrating exemplary embodiments only and are not intended to be limiting. Additionally, it will be appreciated that the drawings are not to scale and that portions of certain elements may be exaggerated for the purpose of clarity and ease of illustration.

In accordance with the present disclosure, a system and method are provided which affect the pitch stability of a vertical takeoff and landing vehicle while in use. The system and method improves aircraft stability while increasing the lifting force without a need to increase size of optimum specifications of the aircraft and achieves the improved performance of coaxial rotors. The system and method improves stability of an aircraft during hover.

Figure 1:
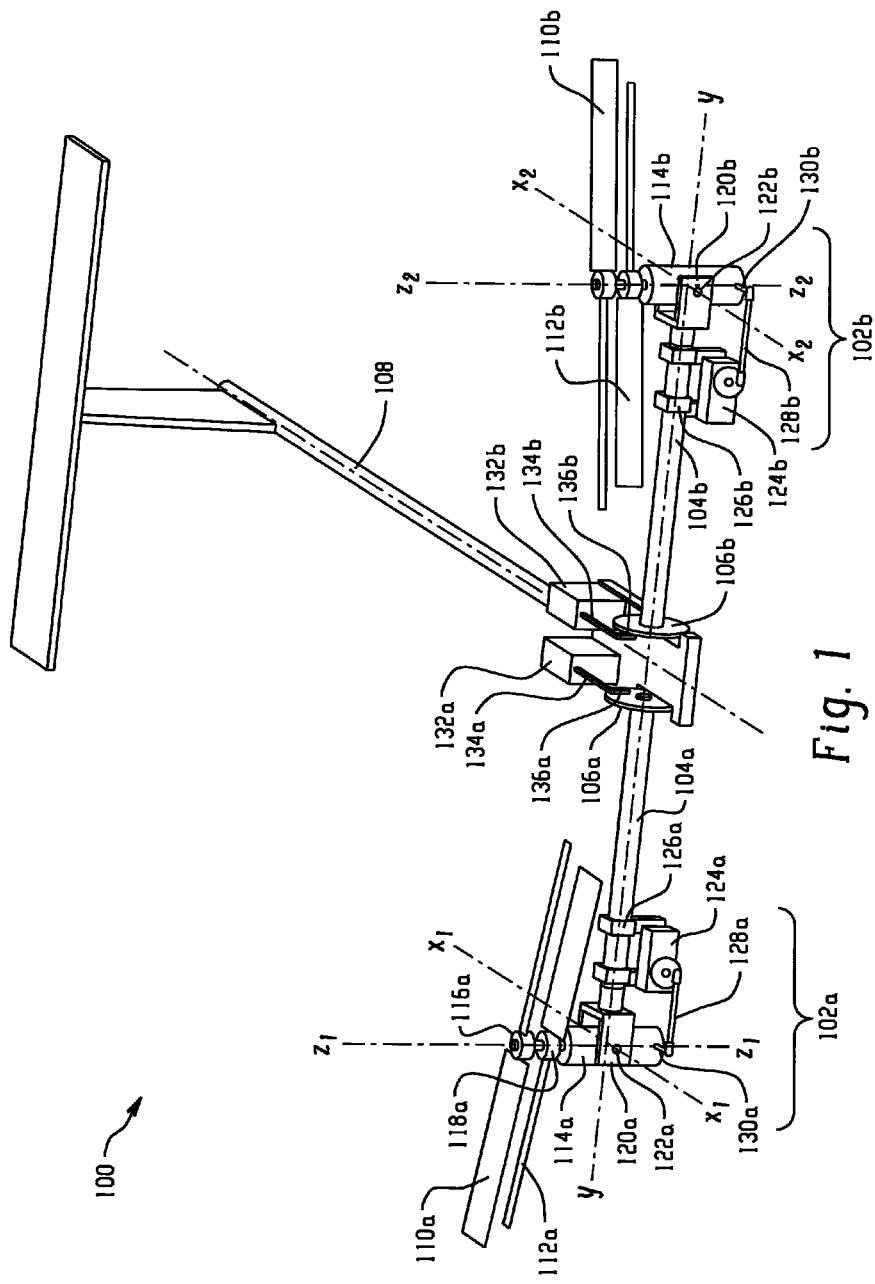
FIG. 1 is a general schematic perspective view of a side by side coaxial vertical takeoff and landing aircraft.

As shown in FIG. 1, a schematic illustration of the vertical takeoff and landing (VTOL) aircraft system 100 illustrates features of the preferred embodiments. More particularly, the aircraft system 100 has two coaxial rotors 102a, 102b with optimum specifications where longitudinal tilting used for forward movement and opposed lateral tilting or oblique active tilting (OAT) is used to improve pitch stability. Optimum specifications relate to the functional relationship between dimensions of the coaxial rotors 102a, 102b as a function of the VTOL vehicle size as well as the desired performance characteristics.

First and second coaxial rotors 102a and 102b are fixed to arms 104a and 104b respectively and are axially aligned along a common longitudinal axis y-y. The arms 104a, 104b are mounted to bearings 106a, 106b attached to a vehicle body or airframe 108 that allow for axial rotation about longitudinal axis y-y. First coaxial rotor 102a includes a first top propeller 110a and a first bottom propeller 112a, each axially aligned along common spin axis $z_1$-$z_1$. Second coaxial rotor 102b includes a second top propeller 110b and a second bottom propeller 112b, each axially aligned along common spin axis $z_2$-$z_2$. During use, coaxial rotors 102a, 102b are configured to operate such that first propellers 110a and 112a rotate in an opposite rotational direction than second propellers 110b and 112b.

When operated, top propellers 110a, 110b generate an airstream in the form of a vortex. The airstream engages the tips or ends of bottom propellers 112a and 112b, respectfully resulting in an induced power loss. Therefore, top propellers 110a and 110b are configured to have a length larger than bottom propellers 112a and 112b to avoid the induced power loss from the vortex airstream generated therein. More particularly, the length of the top propellers 110a, 110b are selected so that the vortex airstream that is created is outside the range which would affect the bottom propellers 112a, 112b.

With particular description of first coaxial rotor 102a, first top and bottom propellers 110a and 112a are rotated about spin axis $z_1$-$z_1$ by motor 114a. Motor 114a may optionally include a single coaxial motor or two separate motors, one for each propeller. Top propeller 110a generally rotates in an opposite direction from bottom propeller 112a but can optionally rotate in the same rotational direction. Top propeller 110a is mounted on top shaft 116a and bottom propeller 112a is mounted on bottom shaft 118a. The top and bottom propellers 110a and 112a are controlled to rotate along a spectrum of rotational or cyclic speeds. Each top and bottom propeller can be operated at the same speeds or at different speeds from one another.

The motor 114a of first coaxial rotor 102a is attached to arm 104a by first yoke 120a. Motor 114a is controlled to tilt or pivot laterally along axis $x_1$-$x_1$ while second coaxial rotor 102b is controlled to tilt or pivot laterally along axis $x_2$-$x_2$. Tilt axis $x_1$-$x_1$ is parallel to tilt axis $x_2$-$x_2$ and is separated by vehicle body 108. Preferably, lateral axis $x_1$-$x_1$ and lateral axis $x_2$-$x_2$ are equally spaced from a central axis along the length of vehicle body 108. A second motor 114b of second coaxial rotor 102b is attached to arm 104b by yoke 120b. Second top and bottom propellers 110b and 112b respectfully are rotated about spin axis $z_2$-$z_2$ by motor 114b. Similarly, motor 114b may optionally include a single coaxial motor or two separate motors, one for each propeller.

First yoke 120a is fixed to arm 104a and is attached to motor 114a by bearings 122a that allow motor 114a, first top propeller 110a, and first bottom propeller 112a to tilt along axis $x_1$-$x_1$. In one embodiment, servo actuator 124a is fixed to arm 104a by a holder 126a. An output arm 128a is operably connected to the servo actuator 124a and a linkage member 130a to rotationally manipulate the motor 114a relative to yoke 120a along lateral axis $x_1$-$x_1$. Servo actuator 124a manipulates output arm 128a in response to an input signal received from a controller or stability augmentation system (not shown). Similarly, a mirror servo actuator 124b, holder 126b, bearings 122b and output arm 128b are operably connected to second coaxial rotor 102b by linkage member 130b such that the rotational angle and rotational rate provided to the second coaxial rotors 102b about axis $x_2$-$x_2$ is equal to the rotational angle and rotational rate provided to the first coaxial rotor 102a about axis $x_1$-$x_1$.

Additionally, servo actuators 132a and 132b are provided at the vehicle body 108. Servo actuators 132a, 132b are operably attached to output arms 134a, 134b and linkage members 136a, 136b to rotably actuate arms 104a. 104b. Servo actuators 132a and 132b manipulate arms 104a and 104b respectfully to rotate along longitudinal axis y-y in response to an input signal generated by the controller. Servo actuators 132a and 132b manipulate the rotation of arms 104a and 104b such that the rotational angle and rotational rate along longitudinal axis y-y is equal for both the first and second coaxial rotors 102a, 102b.

Figure 2:
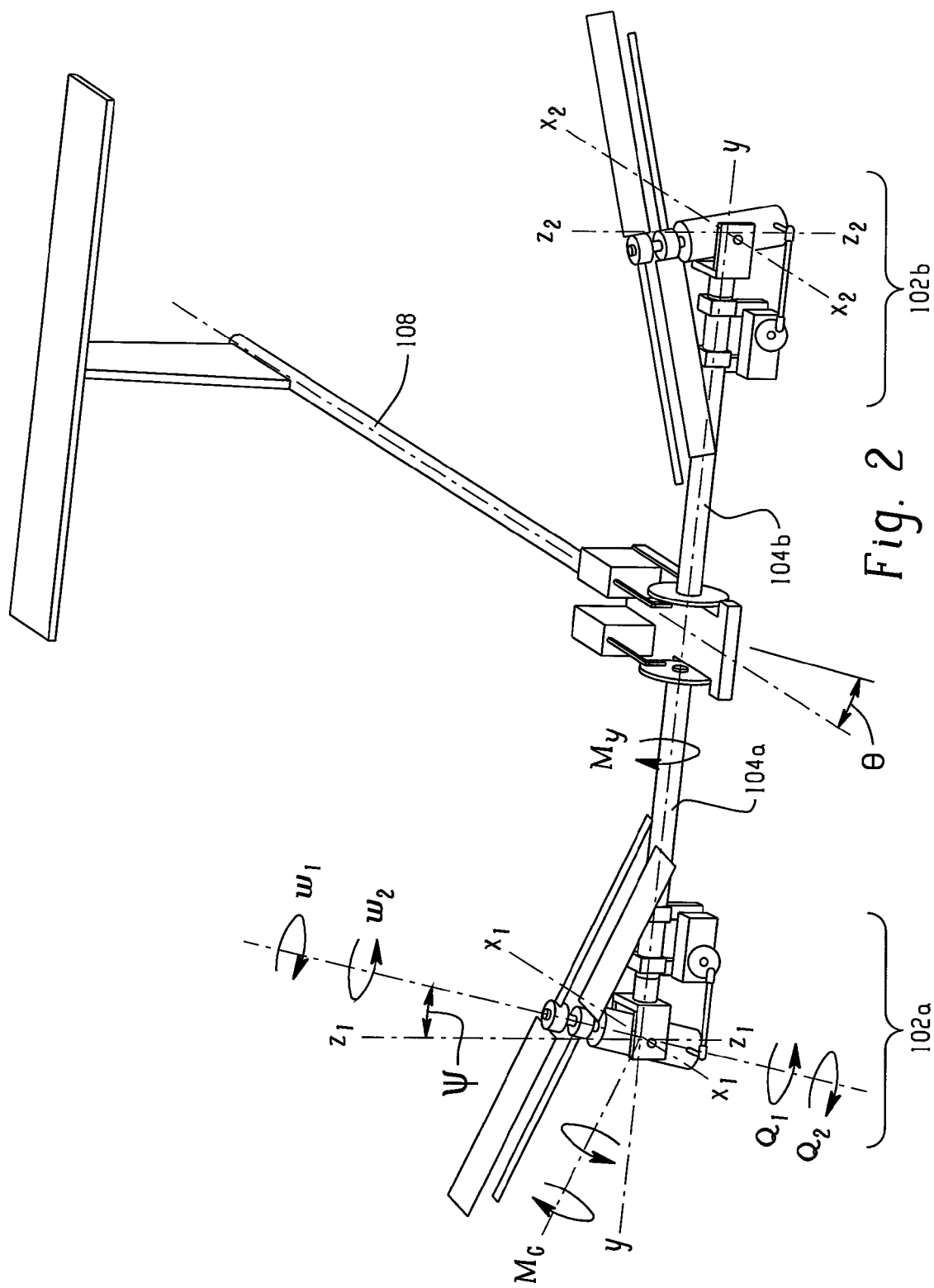
FIG. 2 is a general schematic perspective view of the side by side coaxial vertical takeoff and landing aircraft with each coaxial rotor tilted towards a central axis.

With reference to FIG. 2, first coaxial rotor 102a and second coaxial rotor 102b are simultaneously tilted laterally from spin axes $z_1$-$z_1$ and $z_2$-$z_2$ by equal and opposite angles $\Psi$ and at equal and opposite rates $\dot{\Psi}$ (tilting speed). The tilt of the first coaxial rotor generates gyroscopic moment $M_G$ whose vector is perpendicular to spin axis $z_1$-$z_1$ and tilt axis $x_1$-$x_1$. The magnitude of gyroscopic moment $M_G$ is depicted by the following equations such that $M_G = I_{p1}\omega_1\dot{\Psi} - I_{p2}\omega_2\dot{\Psi}$, where $I_{p1}$ and $I_{p2}$ are the moment of inertia for propellers 110a and 112a respectively and the inertia for motor 114a is ignored. To find the pitch moment $M_y$ which acts on the VTOL vehicle, the $M_G$ horizontal component is solved along the longitudinal axis y-y, and the horizontal component for the propellers torque Q such that $Q=(Q_1-Q_2)$. Therefore, the sum of two effects from the first coaxial rotor and the second coaxial rotor are found by:

$$M_y = 2(M_G \cos\Psi + Q \sin\Psi)$$

$$= 2((I_{p1}\omega_1 - I_{p2}\omega_2)\dot{\Psi}\cos\Psi + (Q_1-Q_2)\sin\Psi)$$

assume the pitching moment about the center of gravity then:

$$\tfrac{1}{2}I_A\ddot{\theta} = (I_{p1}\omega_1 - I_{p2}\omega_2)\dot{\Psi}\cos\Psi + (Q_1-Q_2)\sin\Psi$$

This relationship shows that the disclosed system is dynamically stable in pitch, if simple control is used such that $\dot{\Psi} = -k\theta$. From this relationship it is realized that the amount of pitching moment can be controlled by varying the speed and torque of the top propellers 110a and 110b in relation to the bottom propellers 112a and 112b.

Stated another way, it should also be understood that pitch stability for a VTOL vehicle is a combination of thrust vectoring, gyroscopic moments and other aerodynamic counter-torque forces such as weather induced forces and friction. Gyroscopic moment generally depends on the propeller speeds, rotor torque and tilting speed. The existence of two propellers on each coaxial rotor increases the lifting force and forward movement of the aircraft. The propellers also positively affect the gyroscopic moment to enhance pitch stability by adding more controllability on the amount of gyroscopic moment generated by tilting.

Propellers aligned along the same axis of rotation generally require torque balance for proper performance. This is achieved in a single rotor coaxial system by rotating the top propeller and the bottom propeller in opposite directions and at the same rotational speed. However, this design parameter is not required in the present application by introducing a second coaxial rotor to the aircraft. More particularly, additional design criteria such as propeller size, pitch and speed may be modified as the top propeller and bottom propeller along the common rotational axis are not required to be balanced having the same rotational speed and torque profile. This increases the ability to optimize the coaxial rotors with minimum losses to power and thrust.

Utilization of the side by side VTOL coaxial rotors provides the torque balance for optimal performance while the balance requirements of the top propeller and bottom propeller for each coaxial rotor can be discarded. This allows the top and bottom propellers to be operated at different rotational speeds and torque profiles thereby increasing the lifting and power capabilities of the aircraft. Notably, the top and bottom propellers can rotate in a direction opposite one another or in the same direction since the propellers of the other coaxial rotor will balance the difference in torque.

In one embodiment, it is preferred to balance the difference in torque by operating the first top propeller and the second top propeller at the same rotational speed and in different rotational directions. Additionally, the first bottom propeller and the second bottom propeller operate at the same rotational speed. This relationship minimizes the losses of thrust and power of the VTOL aircraft.

In one embodiment, the pitch of each blade is in a fixed position. The pitch relationship between the top propeller and the bottom propeller of each coaxial rotor is an optimal design feature and is a function of the diameter of the propellers, separation distance and thrust or power. The coaxial rotor design improves the control of gyroscopic moments as well as increases redundancy of thrust and power. The control of pitch stability is particularly helpful as the VTOL aircraft is in transition from a takeoff motion to a hover motion or transitions from hover motion to forward motion. The controller can modulate the relative rotational speeds of the top and bottom propellers to improve the pitch stability during directional transition of the VTOL aircraft.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system for increasing the thrust and power capabilities of a side-by-side vertical takeoff and landing vehicle, the system comprising:
   a first coaxial rotor spaced from a vehicle body and a second coaxial rotor spaced from the vehicle body and opposite the first coaxial rotor along a common axis,
   the first and second coaxial rotors tilting towards a central axis along a length of the vehicle body with a common tilt angle and a common tilt rate while in use,
   the vehicle body including at least one wing, the first coaxial rotor including a first top propeller aligned with a first bottom propeller along a first rotational axis, the second coaxial rotor including a second top propeller aligned with a second bottom propeller along a second rotational axis, wherein the first and second top propellers have a first length and the first and second bottom propellers have a second length such that the first length is greater than the second length; and
   during use, a gyroscopic moment from the coaxial rotors of the vehicle is controlled by a controller to maintain pitch stability by modulating the first and second top propellers to have a different rotational speed from the first and second bottom propellers, wherein the first top propeller and the second top propeller rotate with a common rotational speed and the first bottom propeller and the second bottom propeller rotate with a common rotational speed.

2. The system according to claim 1, wherein the first and second coaxial rotors include propellers having blades with a fixed pitch.

3. The system according to claim 1 wherein the first top propeller and the second top propeller rotate with a common rotational speed and torque.

4. The system according to claim 1 wherein the first bottom propeller and the second bottom propeller rotate with a common rotational speed and torque.

5. The system according to claim 1 wherein the first and second top propellers are spaced from the first and second bottom propellers along each rotational axis by less than 3% of the length of the diameter of the first and second top propellers.

6. The system according to claim 1 wherein the gyroscopic moment maintains pitch stability as the first and second top propellers are rotated with a different rotational direction from the first and second bottom propellers.

7. The system according to claim 1 wherein the first top and bottom propellers and the second top and bottom propellers each include a plurality of blades.

8. The system according to claim 1 wherein the first coaxial rotor has a first torque profile and the second coaxial rotor has a second torque profile such that the combination of the first torque profile and second torque profile provide a stable pitch balance of the vehicle while in use.

9. The system according to claim 1, wherein the side-by-side vertical takeoff and landing vehicle is unmanned.

10. The system according to claim 2 wherein the relationship of a pitch angle of the first and second top propellers relative to the first and second bottom propellers is a function of a diameter length of the top and bottom propellers, a separation length between the top and bottom propellers, a thrust profile and a power profile of the system.

11. A side-by-side vertical takeoff and landing device comprising:
   a first coaxial rotor attached to a first articulating member extending from a first arm and having a first top propeller and a first bottom propeller with fixed pitch blades that are configured to rotate along a first rotational axis, the first arm is rotatably connected to a vehicle body along a longitudinal axis, the vehicle body including at least one wing;
   a second coaxial rotor attached to a second articulating member extending from a second arm and having a second top propeller and a second bottom propeller with fixed pitch blades that are configured to rotate along a second rotational axis, the second arm is rotatably connected to the vehicle body along the longitudinal axis, wherein the first and second to propellers have a first length and the first and second bottom propellers have a second length such that the first length is greater than the second length; and
   a controller for modulating the rotational speed and torque of the top and bottom propellers to control a pitch stability of the device, wherein during use a gyroscopic moment from the coaxial rotors is controlled to maintain pitch stability by modulating the first and second top propellers to have a different rotational speed from the first and second bottom propellers and tilting the first and second coaxial rotors towards a central axis along a length of the vehicle body with a common tilt angle and a common tilt rate, wherein the first and second coaxial rotors are controlled to rotate the first and second top propellers with common rotational torque and the first and second bottom propellers with common rotational torque.

12. The device according to claim 11 wherein the first and second articulating members includes servo actuators controlled by the controller for laterally rotating the first and second coaxial rotors in proportion toward the vehicle body.

13. The device according to claim 11 wherein the first and second coaxial rotors are configured to operate the top propellers with different angular speed and torque than the bottom propellers while maintaining a pitch stability of the device.

14. The device according to claim 11 wherein the first and second coaxial rotors are controlled to rotate the first and second top propellers with common rotational speed and torque and the first and second bottom propellers with common rotational speed and torque.

15. The device according to claim 11 wherein the first and second top propellers are spaced from the first and second bottom propellers along each rotational axis by less than 3% of the length of the diameter of the first and second top propellers.

16. The device according to claim 11 wherein the first coaxial rotor is controlled at a first torque profile and the second coaxial rotor is controlled at a second torque profile such that the combination of the first torque profile and the second torque profile stabilizes the vehicle when operated.

17. The device according to claim 12 wherein the first and second arms are rotatably connected to the vehicle body by servo actuators controlled by the controller to longitudinally rotate the first and second arms in proportion toward a front portion of the vehicle body.

18. A method of stabilizing a side-by-side vertical take off and landing vehicle comprising:
   providing a first coaxial rotor spaced from a vehicle body and a second coaxial rotor spaced from the vehicle body and opposite the first coaxial rotor along a common axis, the vehicle body extends along a longitudinal axis and includes at least one rear wing;
   rotating a first top propeller at the same angular speed and torque as a second top propeller, wherein the first and second to propellers have a first length and the first and second bottom propellers have a second length such that the first length is greater than the second length;
   rotating a first bottom propeller at the same angular speed and torque as a second bottom propeller; and
   controlling a gyroscopic moment from the coaxial rotors of the vehicle by a controller to maintain pitch stability by modulating the first and second top propellers to have a different rotational speed from the first and second bottom propellers and tilting the first and second coaxial rotor towards a central axis along a length of the vehicle body with a common tilt angle and a common tilt rate during use to improve the pitch stability and increase thrust and power capabilities of the vehicle,
   wherein the first top propeller and the second top propeller rotate with a common rotational speed and the first bottom propeller and the second bottom propeller rotate with a common rotational speed.

19. The method according to claim 18 further comprising controlling a lateral motion of the vehicle by longitudinally rotating the first and second coaxial rotors along the common axis.

* * * * *